US010330873B2

(12) United States Patent
Chuang et al.

(10) Patent No.: US 10,330,873 B2
(45) Date of Patent: Jun. 25, 2019

(54) PLUG UNLOCKING STRUCTURE OF OPTICAL TRANSCEIVER MODULE

(71) Applicant: Delta Electronics, Inc., Taoyuan (TW)

(72) Inventors: Wen-Ching Chuang, Taoyuan (TW); Chen-Mao Lu, Taoyuan (TW); Chih-Hong Cheng, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 15/883,200

(22) Filed: Jan. 30, 2018

(65) Prior Publication Data

US 2018/0372969 A1 Dec. 27, 2018

(30) Foreign Application Priority Data

Jun. 26, 2017 (CN) .................... 2017 2 0753198 U

(51) Int. Cl.
*G02B 6/42* (2006.01)

(52) U.S. Cl.
CPC ......... *G02B 6/4261* (2013.01); *G02B 6/4292* (2013.01)

(58) Field of Classification Search
CPC .... G02B 6/4261; G02B 6/426; G02B 6/4292; G02B 6/4284
See application file for complete search history.

(56) References Cited

U.S. PATENT DOCUMENTS

| 9,423,575 | B2 * | 8/2016 | Yang ................... G02B 6/4261 |
| 9,523,826 | B2 * | 12/2016 | Tsai ...................... G02B 6/423 |
| 9,581,773 | B2 * | 2/2017 | Okabe ................. G02B 6/4261 |
| 9,720,189 | B1 * | 8/2017 | Wang .................... G02B 6/387 |
| 9,910,229 | B2 * | 3/2018 | Mori ..................... G02B 6/387 |
| 10,079,452 | B1 * | 9/2018 | Zhang ............... H01R 13/5812 |
| 10,191,229 | B2 * | 1/2019 | Matsui ................ G02B 6/4293 |
| 2017/0031109 | A1 * | 2/2017 | Meadowcroft ...... G02B 6/3893 |
| 2017/0097484 | A1 * | 4/2017 | Teo ....................... G02B 6/4284 |

* cited by examiner

*Primary Examiner* — John Bedtelyon
(74) *Attorney, Agent, or Firm* — Chun-Ming Shih; HDLS IPR Services

(57) ABSTRACT

A plug unlocking structure of an optical transceiver module includes a main body, a linkage assembly, and a pull handle. The linkage assembly is pivotally coupled to the main body. The linkage assembly includes a locking arm and at least one linking arm extended from the locking arm. The extending directions of the locking arm and the linking arm are different, and an elastic element is installed between the linking arm and the main body. The pull handle is linked to the linking arm. The linkage assembly is pivotally coupled to the main body through the pivoting point of the locking arm, and the locking arm has a latching pin. The position of the pivoting point of the locking arm is between the latching pin and the linking arm.

18 Claims, 6 Drawing Sheets

PLUG UNLOCKING STRUCTURE OF OPTICAL TRANSCEIVER MODULE

FIELD OF THE INVENTION

This disclosure generally relates to the field of interface devices for converting an electrical signal into an optical signal, and more particularly to a plug unlocking structure of an optical transceiver module.

BACKGROUND OF THE INVENTION

To cope with the requirement for an increasingly higher cable transmission rate, conventional copper cables are replaced by optical fiber cables, particularly for the backbone network portion. In present high-speed communication networks, an optical transceiver module (such as SFP) is provided for the connection and transmission of signals of an electronic communication device. In addition, the optical transceiver module may be plugged into a corresponding cage of the communication device to provide sufficient flexibility for adjusting system design or meeting the requirements of maintenance, repair, and replacement.

In general, when it is desired to plug the optical transceiver module into the cage of the communication device, a latching structure is provided for enabling the optical transceiver module to be locked into the cage securely after the optical transceiver module is plugged and positioned, and a related linkage mechanism is provided and may be pulled to unlock the latching structure when it is desired to pull out the optical transceiver module, so as to facilitate removal of the optical transceiver module from the cage.

However, the latching mechanism installed between the conventional optical transceiver module and the cage may be detached by mistake easily because of insufficient consideration of the design in shifting of fulcrum, and therefore detachment may occur easily by a small amplitude of movement in the unlocking process. For example, the device may be vibrated or affected by an external force, the latching position may bounce to end up with a sudden unlock, so that the optical transceiver module is separated from the cage of the device without warning, which leads to a higher risk of damage to the communication device.

In view of the aforementioned drawbacks of the conventional optical transceiver module, the inventor studied various technologies and created an effective solution in the present disclosure.

SUMMARY OF THE INVENTION

Therefore, it is a primary objective of this disclosure to provide a plug unlocking structure of an optical transceiver module capable of adjusting and changing a pivoting point (or position) between mechanical parts, such that it requires a large amplitude (or angle) of movement to unlock a latching pin. In the meantime, it takes a longer pull stroke for users to unlock the latching pin to avoid the aforementioned drawback of the accidental detachment.

Another objective of this disclosure is to provide a plug unlocking structure of an optical transceiver module capable of providing a horizontal elastic restoring force in a moving direction which is the same as the extending direction of the latching pin to improve the latching effect and overcome the aforementioned drawback of the accidental detachment.

To achieve the aforementioned objective, this disclosure provides a plug unlocking structure of an optical transceiver module, comprising a main body, a linkage assembly, and a pull handle. The linkage assembly is pivotally coupled to the main body. The linkage assembly comprises a locking arm and at least one linking arm extended from the locking arm. The extending directions of the locking arm and the linking arm are different. An elastic element is installed between the linking arm and the main body. The pull handle is linked to the linking arm. The linkage assembly is pivotally coupled to the main body through the pivoting point of the locking arm. The locking arm further includes a latching pin, wherein the pivoting point of the locking arm is disposed between the latching pin and the linking arm.

To achieve the aforementioned objective, this disclosure provides a plug unlocking structure of an optical transceiver module, which is provided to be plugged into a cage having a locking hole. The optical transceiver module comprises a main body, a linkage assembly and a pull handle. The linkage assembly is pivotally coupled to the main body. The linkage assembly comprises a locking arm and at least one linking arm extended from the locking arm, wherein the extending direction of the locking arm and the extending direction of the linking arm are different, and an elastic element is installed between the linking arm and the main body. The pull handle is linked to the linking arm, wherein the linkage assembly is pivotally coupled to the main body through the pivoting point of the locking arm. The locking arm further includes a latching pin. The pivoting point of the locking arm is disposed between the latching pin and the linking arm.

To achieve the aforementioned objective, this disclosure provides a plug unlocking structure of an optical transceiver module, comprising a main body, a linkage assembly and a pull handle. The linkage assembly is pivotally coupled to the main body. The linkage assembly comprises a locking arm and two linking arms extended respectively downwardly from two sides of the locking arm. The extending direction of the locking arm and the extending direction of the linking arm are different. Two elastic elements are installed between the linking arm and the main body. Two blocking edges are protruded from the two linking arms towards the main body. A pull handle is linked to the two linking arms. The locking arm is disposed on an upper surface of the main body. The two linking arms are disposed at two sides of the main body respectively. Two accommodating slots are formed on the two sides of the main body, respectively. Each blocking edge is extended into a rear end of each respective accommodating slot. The main body has a retaining wall formed at a front end of each accommodating slot. Each elastic element is received by each respective accommodating slot and abutted between each retaining wall and each blocking edge, so that the moving direction of each elastic element is the same as the extending direction of the locking arm.

DESCRIPTION OF THE PREFERRED EMBODIMENTS

Detailed descriptions and technical contents of the present invention are illustrated below in conjunction with the accompany drawings. However, it is to be understood that the descriptions and the accompany drawings disclosed herein are merely illustrative and exemplary and not intended to limit the scope of the present invention.

Figure 1:
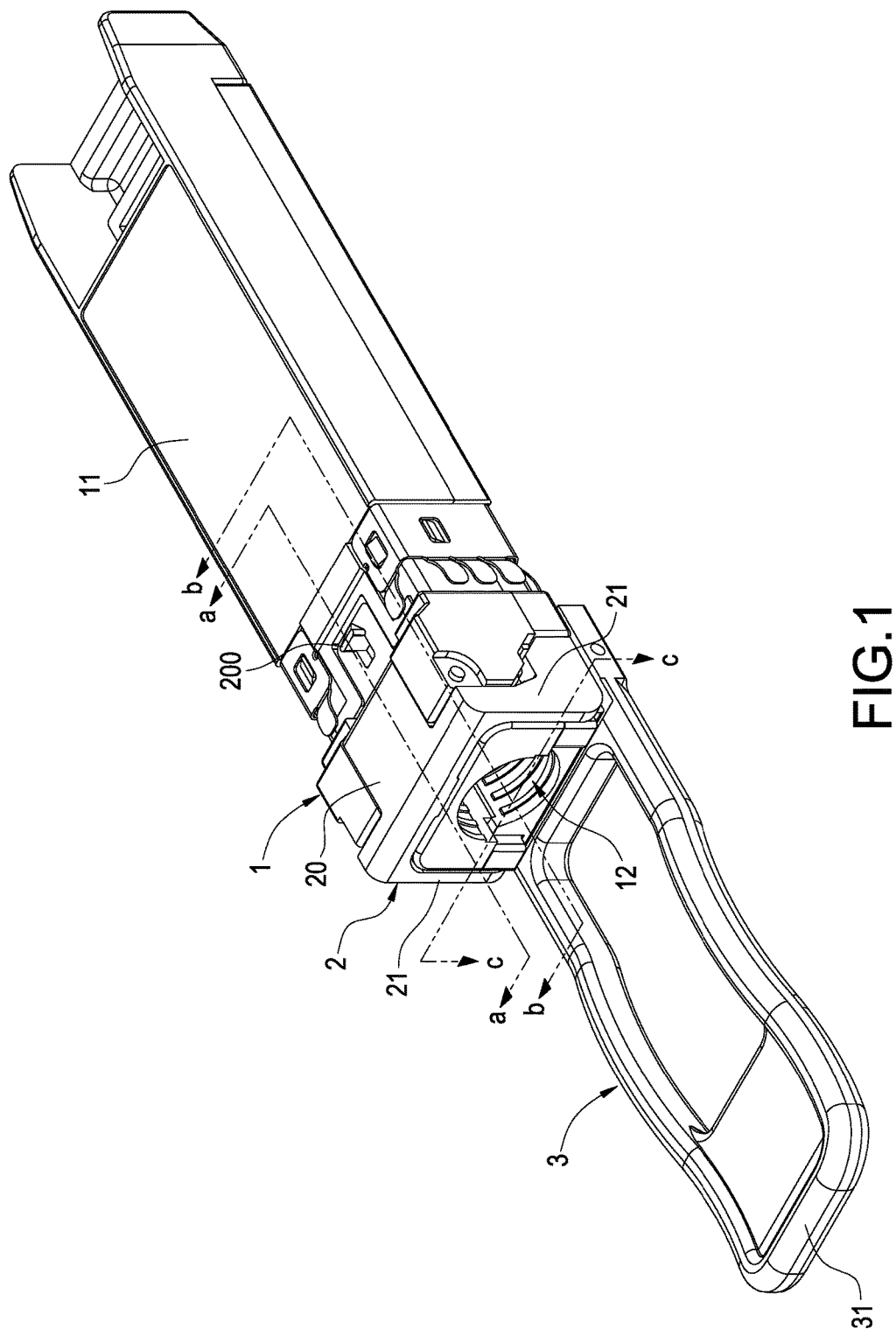
FIG. 1 is a perspective view of this disclosure.
Figure 2:
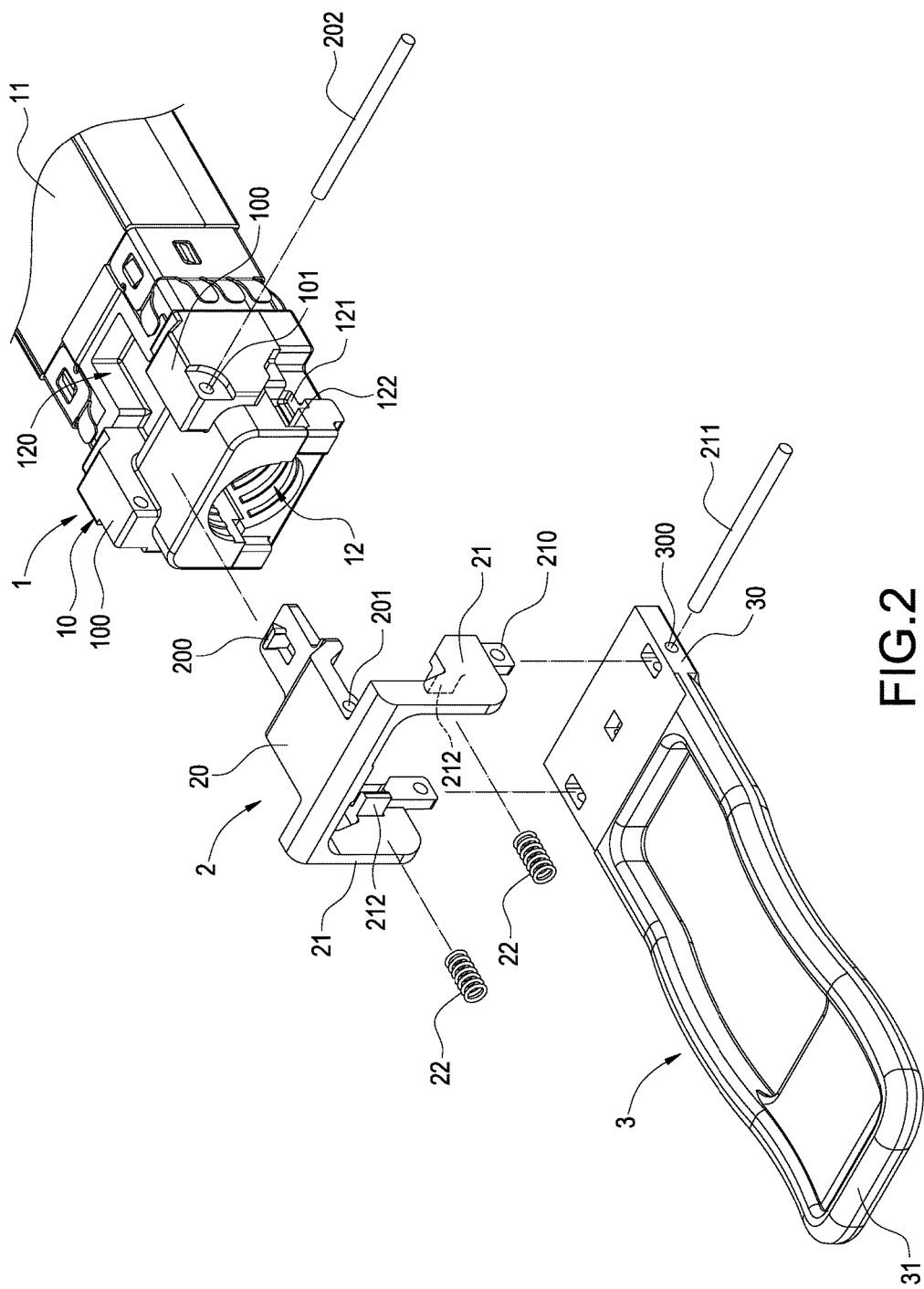
FIG. 2 is a partial exploded view of this disclosure.
Figure 3:
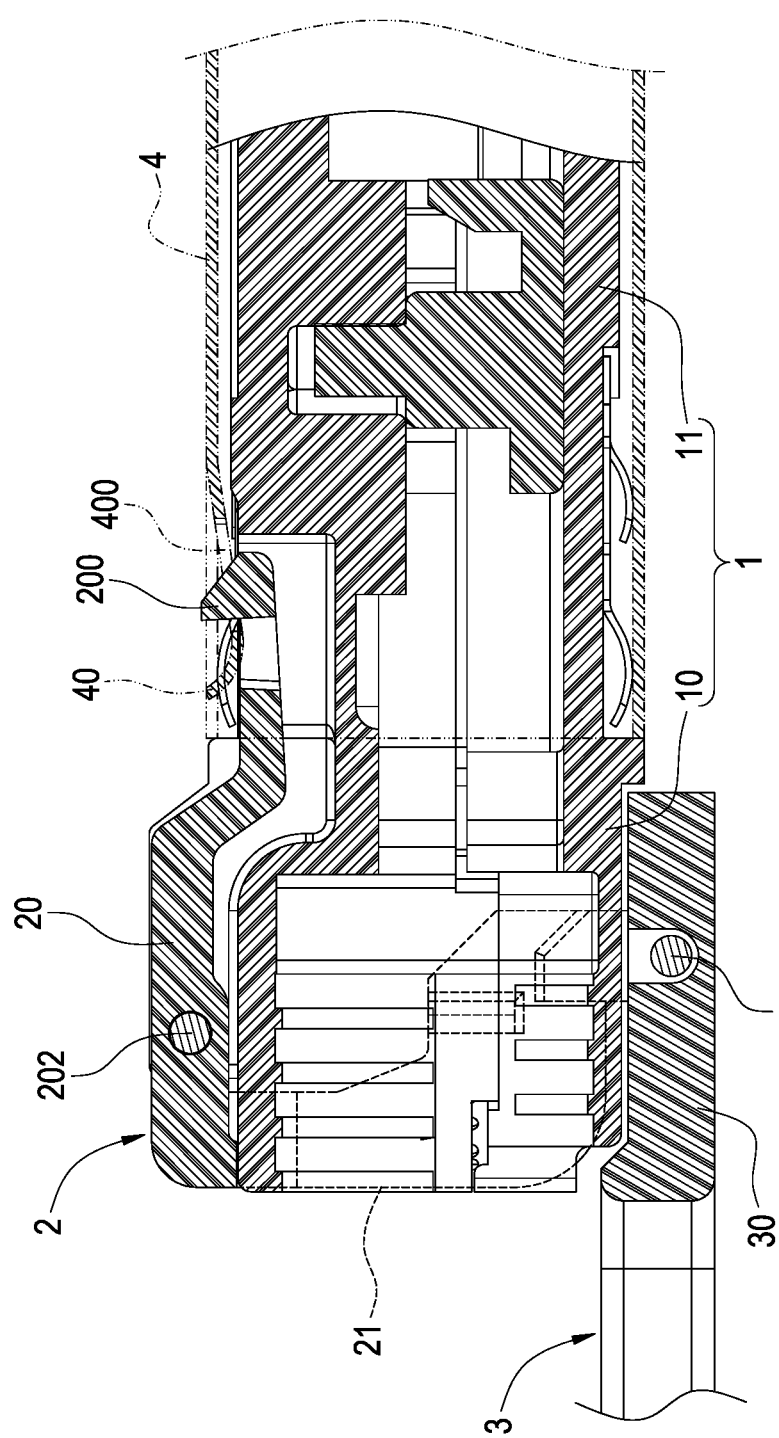
FIG. 3 is a cross-sectional view of Section a-a of FIG. 1.

With reference to FIGS. 1, 2 and 3 for a perspective view, an exploded view, and a cross-sectional view of Section a-a of a plug unlocking structure of an optical transceiver module in this disclosure respectively, the plug unlocking structure comprises a main body 1, a linkage assembly 2, and a pull handle 3.

The main body 1 is a main portion of the optical transceiver module, which is plugged into a cage 4 of a communication device and provided for plugging into an optical fiber connector (not shown in the drawings) to achieve the effect of connection. The main body 1 comprises a joint 10, and a plug-in part 11, and a jack 12. As shown in FIG. 3, the jack 12 is disposed at a front end of the joint 10 and provided for plugging the optical fiber connector. The plug-in part 11 is coupled to the joint 10 and extended form a rear end of the joint 10. The plug-in part 11 is plugged into the cage 4 of the communication device.

The linkage assembly 2 is pivotally coupled to the joint 10 of the main body 1 for providing a latching effect to prevent the main body 1 from falling out from the cage 4 when the plug-in part 11 of the main body 1 is plugged into the cage 4 of the communication device, so as to ensure the stability of the optical fiber communication connection. By using the pull handle 3, an unlocking effect can be achieved to facilitate users to remove the main body 1 from the cage 4. The linkage assembly 2 comprises a locking arm 20 and at least one linking arm 21 extended from the locking arm 20. An extending direction of the locking arm 20 and an extending direction of the linking arm 21 are different. An elastic element 22 is installed between the linking arm 21 and the main body 1 for restoring the linkage assembly 2 to its original position after the operation. The locking arm 20 has a latching pin 200 disposed corresponding to a locking hole 400 of a latching plate 40 of the cage 4. When the main body 1 is plugged into the cage 4, the latching pin 200 is latched in the locking hole 400.

In the preferred embodiment of this disclosure, the locking arm 20 is disposed at the joint 10 of the main body 1. The joint 10 has a pair of locking arm pivot portions 100 protruded therefrom for pivotally coupling the locking arm 20. Furthermore, the locking arm 20 has a locking arm pivot hole 201 disposed corresponding to a corresponding one of the pair of the locking arm pivot portions 100 and provided for insertion of a locking arm pivot 202, so that the locking arm pivot 202 is passed through the locking arm pivot hole 201 to pivotally couple with a connector pivot hole 101 of the joint 10. Therefore, the latching pin 200 of the locking arm 20 may swing by using the locking arm pivot hole 201 as a fulcrum, so as to separate the latching pin 200 from the locking hole 400 of the cage 4. To facilitate the operation of separating the latching pin 200 from the locking hole 400. The joint 10 further includes a withdrawing slot 120 concavely formed thereon. The latching pin 200 may be sunken into the withdrawing slot 120 to achieve the unlocking effect, and the withdrawing slot 120 provides sufficient operating space when the latching pin 200 is separated from the locking hole 400 (as shown in FIG. 4).

The linking arm 21 is extended outwardly and downwardly from two sides of the locking arm 20, respectively. In other words, there are two linking arms 21 disposed on both left and right sides of the joint 10 respectively, and each linking arm 21 is pivotally coupled to the pull handle 3. Further, the pull handle 3 comprises a base 30, and a pull portion 31 protruded from the base 30. The base 30 has a pull handle pivot hole 300 formed thereon. Each linking arm 21 has a corresponding pull handle pivot portion 210 provided for pivotally coupling a pull handle pivot 211, so that a user may pull the pull portion 31 of the pull handle 3 to drive the linking arm 21 in order to swing the linkage assembly 2 by using the locking arm pivot hole 201 as a fulcrum. In the meantime, the locking arm 20 drives the latching pin 200 to be separated from the locking hole 400 of the latching pin 200 by the swinging of the linkage assembly 2, so as to facilitate the removal of the main body 1 from the cage 4.

Figure 4:
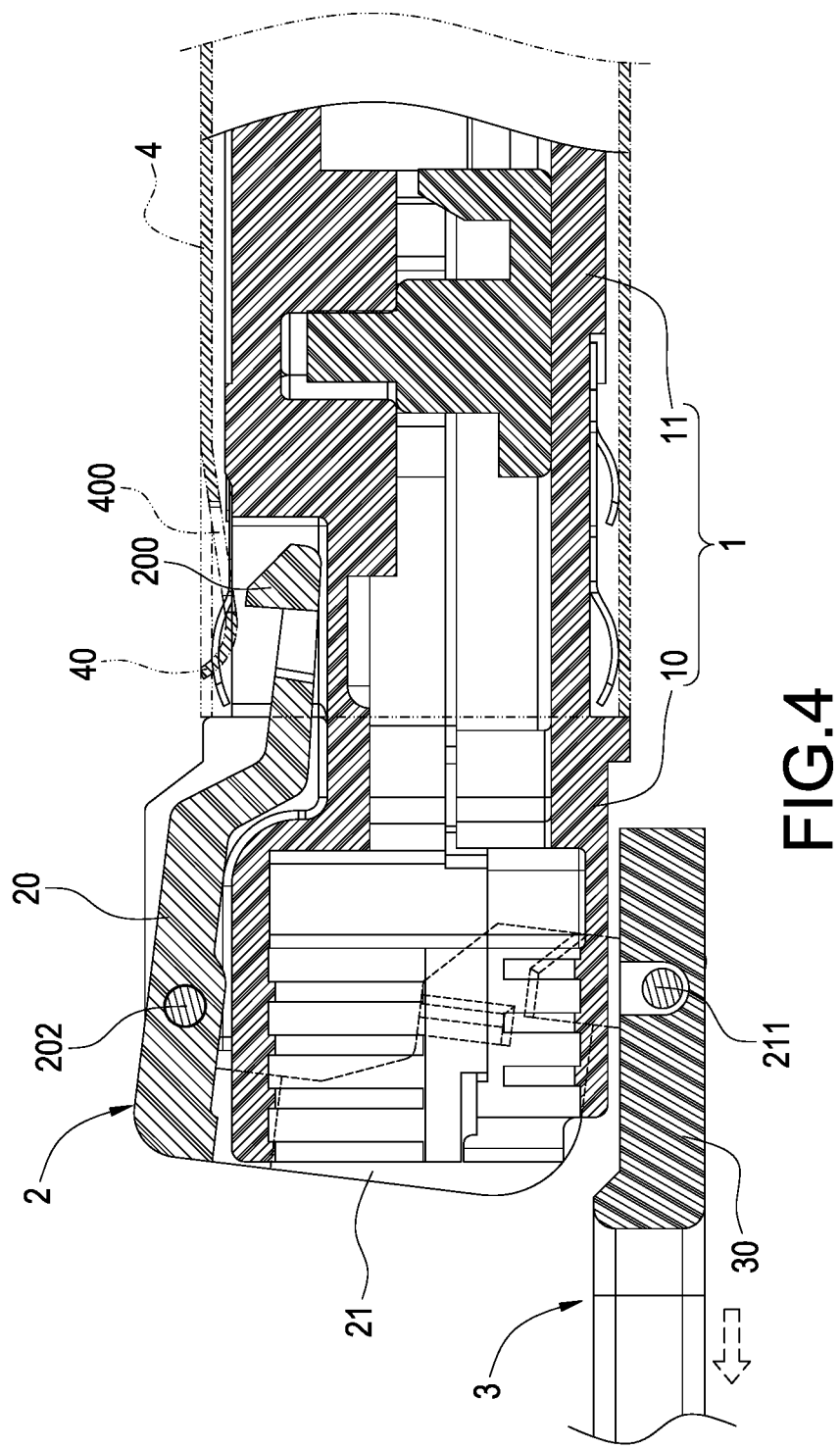
FIG. 4 is a schematic view illustrating operation based on FIG. 3.

As shown in FIG. 4, by utilizing the locking arm pivot hole 201 (which is the pivoting point of the main body 1 and the linkage assembly 2) between the latching pin 200 and the linking arm 21. A larger amplitude (or angle) of movement of the linking arm 21 is required to separate the latching pin 200 from the locking hole 400 when the pull handle 3 pulls the linkage assembly 2. The pull handle 3 needs to have a long pull stroke such that the user can remove the main body 1 from the cage 4. Therefore, with improved stability, this disclosure prevents the latching pin 200 from bouncing or causing a sudden unlock, prevents the main body 1 from separating from the cage 4 without warning, and prevents operation of the communication device from being affected when the optical transceiver module is plugged into the communication device.

Figure 5:
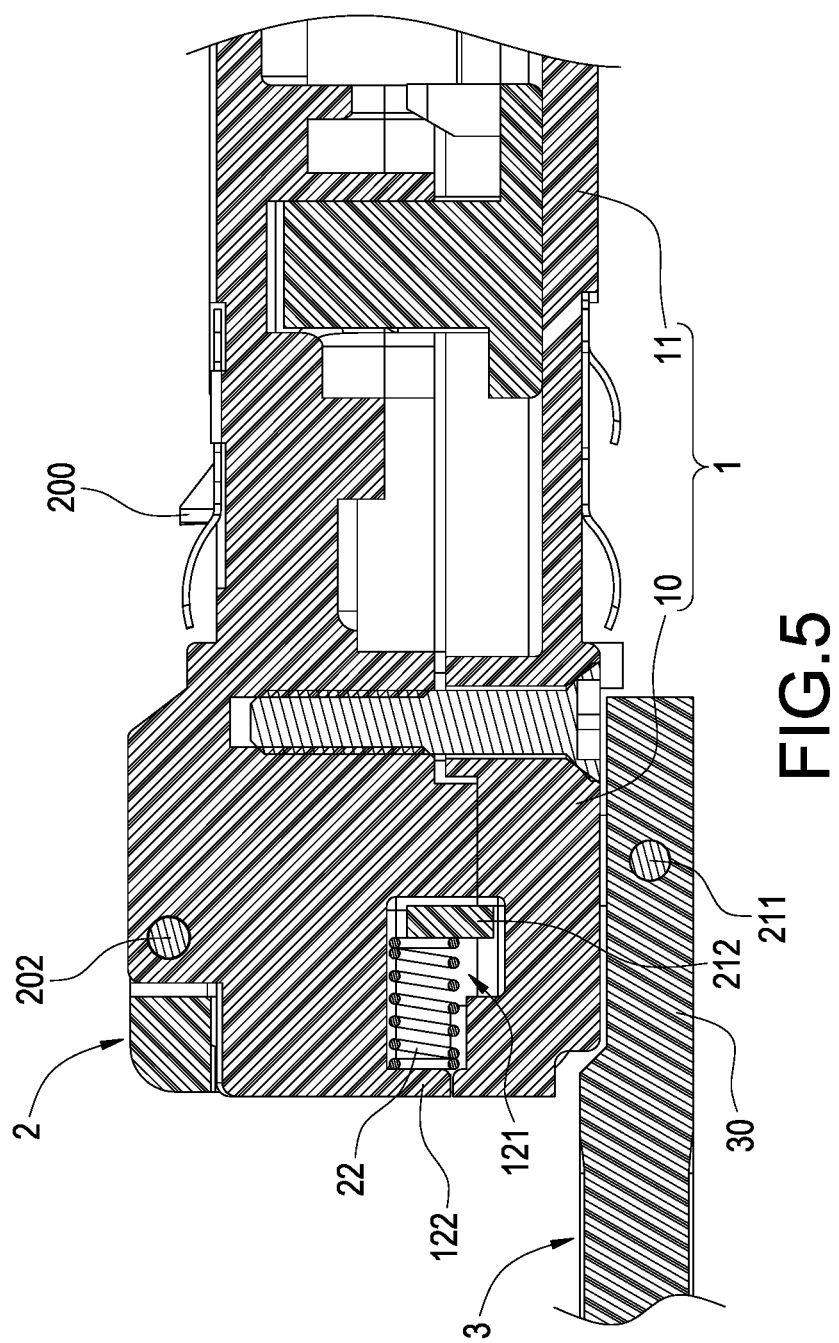
FIG. 5 is a cross-sectional view of Section b-b of FIG. 1.
Figure 6:
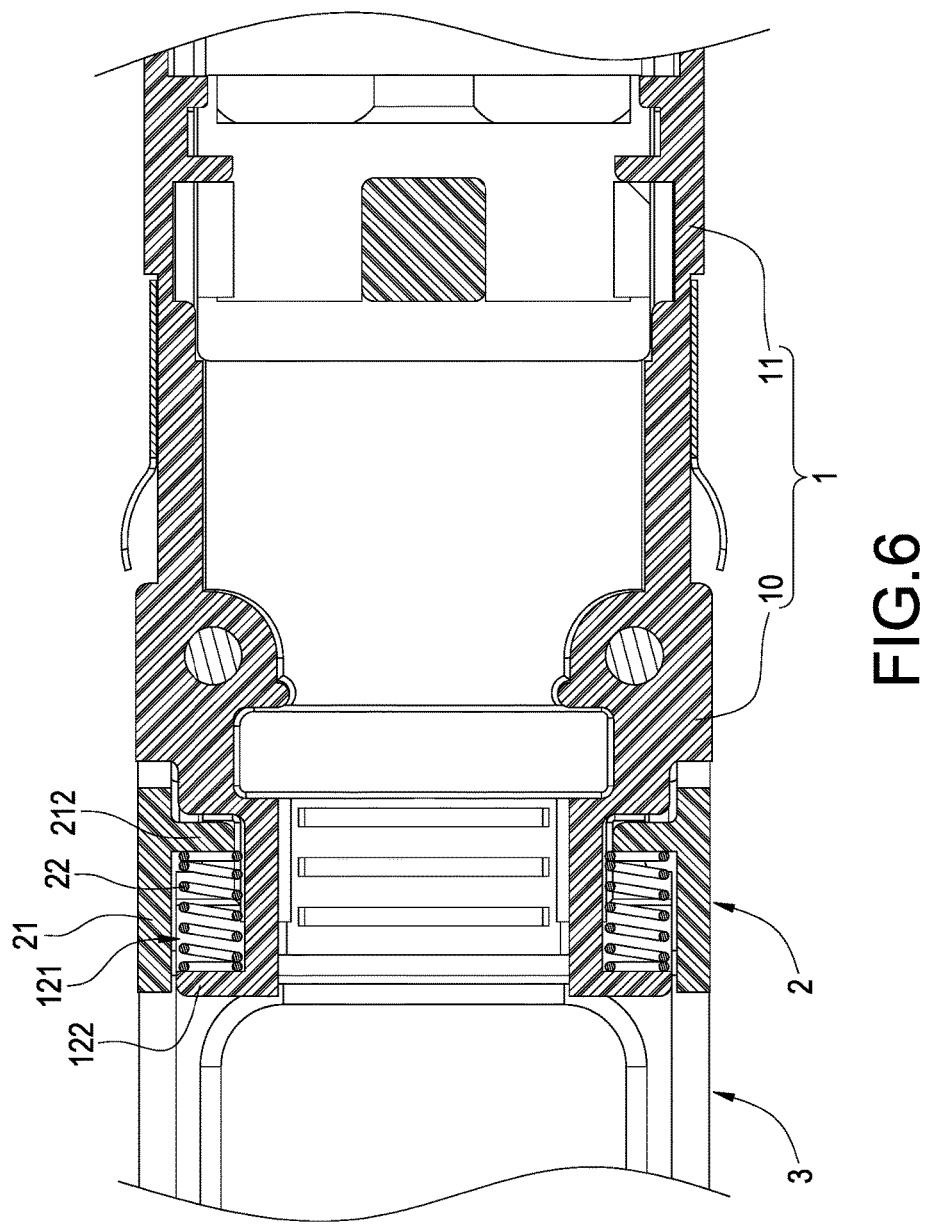
FIG. 6 is a cross-sectional view of Section c-c of FIG. 1.

In addition, any linking arm 21 and the locking arm 20 of this disclosure are arranged in a substantially L-shape. In other words, the locking arm 20 is disposed on the upper surface of the main body 1. The two linking arms 21 are disposed at both left and right sides of the main body 1, respectively. An accommodating slot 121 may be formed separately on both left and right sides of the main body 1 and provided for receiving the elastic element 22. In FIGS. 5 and 6, the main body 1 has a retaining wall 122 formed at a front end of each accommodating slot 121. Two blocking edges 212 are protruded from the two linking arms 21 towards the main body 1. The blocking edge 212 is extended into a rear end of the accommodating slot 121. Each elastic element 22 is abutted between the retaining wall 122 and the blocking edge 212. Therefore, the elastic element 22 provides a horizontal elastic force to the linkage assembly 2 to restore it to its original position. The moving direction of each elastic element 22 is the same as the extending direction of the locking arm 20.

The aforementioned structure and assembly constitute the plug unlocking structure of an optical transceiver module of this disclosure.

In the plug unlocking structure of the optical transceiver module of this disclosure, the pivoting point (or position) between the main body 1 and the linkage assembly 2 is closer to the latching pin 200, so that it requires a larger amplitude (or angle) of movement of the linking arm 21 to separate the latching pin 200 from the locking hole 400, and the pull handle 3 needs a longer pull stroke to unlock. Therefore, this disclosure can prevent or lower the risk of accidental detachment of the latching pin 200 from the locking hole 400. In addition, the elastic element 22 of this disclosure provides a horizontal elastic restoring force, and its moving direction is the same as the extending direction of locking arm 20, so that the latching and locking effects are improved to further reduce the chance of detaching the latching pin 200 from the locking hole 400 by mistake.

In summary, this disclosure achieves the expected objectives and overcomes the drawbacks of the prior art. This disclosure complies with patent application requirements, and is thus duly filed for patent application.

While this disclosure has been described by means of specific embodiments, numerous modifications and variations could be made thereto by those skilled in the art without departing from the scope and spirit of this disclosure set forth in the claims.

What is claimed is:

1. A plug unlocking structure of an optical transceiver module, comprising:
    a main body;
    a linkage assembly pivotally coupled to the main body, the linkage assembly comprising a locking arm and at least one linking arm extended from the locking arm, wherein an extending direction of the locking arm and an extending direction of the linking arm are different, and an elastic element is disposed between the linking arm and the main body; and
    a pull handle linked to the linking arm;
    wherein the linkage assembly is pivotally coupled to the main body through a pivoting point of the locking arm, the locking arm further includes a latching pin, and the pivoting point of the locking arm is disposed between the latching pin and the linking arm.

2. The plug unlocking structure of the optical transceiver module according to claim 1, wherein the main body comprises a joint and a plug-in part, a jack is disposed at a front end of the joint and extended inwardly, and the plug-in part is coupled to the joint and extended outwardly from a rear end of the joint.

3. The plug unlocking structure of the optical transceiver module according to claim 2, wherein the linkage assembly is pivotally coupled to the joint of the main body.

4. The plug unlocking structure of the optical transceiver module according to claim 2, wherein the locking arm is disposed at the joint of the main body, and a pair of locking arm pivot portions are protruded from the joint and pivotally coupled to the pivoting point of the locking arm.

5. The plug unlocking structure of the optical transceiver module according to claim 4, wherein the joint has a withdrawing slot concavely formed thereon, the withdrawing slot is disposed corresponding to the locking arm, and an unlocking effect is achieved by sinking the latching pin into the withdrawing slot.

6. The plug unlocking structure of the optical transceiver module according to claim 2, wherein the plug unlocking structure includes two linking arms, and the two linking arms are respectively downwardly extended from two sides of the locking arm and respectively disposed at two sides of the joint.

7. The plug unlocking structure of the optical transceiver module according to claim 6, wherein the pull handle comprises a base and a pull portion protruded from the base, the base comprises a pull handle pivot hole, and each linking arm has a corresponding pull handle pivot portion pivotally coupled to a pull handle pivot.

8. The plug unlocking structure of the optical transceiver module according to claim 1, wherein the linking arm and the locking arm are arranged in a substantially L-shape.

9. A plug unlocking structure of an optical transceiver module, provided to be plugged into a cage having a locking hole, comprising:
    a main body;
    a linkage assembly pivotally coupled to the main body, the linkage assembly comprising a locking arm and at least one linking arm extended from the locking arm, wherein an extending direction of the locking arm and an extending direction of the linking arm are different, and an elastic element is disposed between the linking arm and the main body; and
    a pull handle linked to the linking arm; wherein the linkage assembly is pivotally coupled to the main body through a pivoting point of the locking arm, the locking arm further includes a latching pin, and the pivoting point of the locking arm is disposed between the latching pin and the linking arm.

10. The plug unlocking structure of the optical transceiver module according to claim 9, wherein the main body comprises a joint and a plug-in part, a jack is disposed at a front end of the joint and extended inwardly, and the plug-in part is coupled to the joint and extended outwardly from a rear end of the joint.

11. The plug unlocking structure of the optical transceiver module according to claim 10, wherein the linkage assembly is pivotally coupled to the joint of the main body.

12. The plug unlocking structure of the optical transceiver module according to claim 10, wherein the locking arm is disposed at the joint of the main body, and a pair of locking arm pivot portions are protruded from the joint and pivotally coupled to the pivoting point of the locking arm.

13. The plug unlocking structure of the optical transceiver module according to claim 12, wherein the joint has a withdrawing slot concavely formed thereon, and the withdrawing slot is disposed corresponding to the locking arm.

14. The plug unlocking structure of the optical transceiver module according to claim 10, wherein the plug unlocking structure includes two linking arms, and the two linking arms are respectively downwardly extended from two sides of the locking arm and respectively disposed at two sides of the joint.

15. The plug unlocking structure of the optical transceiver module according to claim 14, wherein the pull handle comprises a base and a pull portion protruded from the base, the base comprises a pull handle pivot hole, and each linking arm has a corresponding pull handle pivot portion pivotally coupled to a pull handle pivot.

16. The plug unlocking structure of the optical transceiver module according to claim 9, wherein the linking arm and the locking arm are arranged in a substantially L-shape.

17. A plug unlocking structure of an optical transceiver module, comprising:
    a main body;
    a linkage assembly pivotally coupled to the main body, the linkage assembly comprising a locking arm and two linking arms extended respectively downwardly from two sides of the locking arm, wherein an extending direction of the locking arm and an extending direction of the linking arm are different;
    two elastic elements disposed between the linking arm and the main body;
    a pull handle linked to the two linking arms;
    at least two accommodating slots formed on two sides of the main body respectively; and
    at least two blocking edges protruded from the two linking arms towards the main body, respectively, wherein the locking arm is disposed on an upper surface of the main body, and the two linking arms are disposed at two sides of the main body respectively, wherein each of those blocking edges is extended into rear end of each respective accommodating slot, the main body has a retaining wall formed at a front end of each accommodating slot, and each elastic element is received by each respective accommodating slot and abutted between each retaining wall and each blocking edge, so that a moving direction of each elastic element is the same as an extending direction of the locking arm.

18. The plug unlocking structure of the optical transceiver module according to claim 17, wherein the two linking arms and the locking arm are arranged in a substantially L-shape.

* * * * *